(12) United States Patent
Adler

(10) Patent No.: US 6,887,809 B1
(45) Date of Patent: May 3, 2005

(54) OPEN-CELLED SILICON CARBIDE FOAM CERAMIC AND METHOD FOR PRODUCTION THEREOF

(75) Inventor: Jörg Adler, Meissen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/362,522

(22) PCT Filed: Aug. 3, 2001

(86) PCT No.: PCT/DE01/03044

§ 371 (c)(1),
(2), (4) Date: Aug. 11, 2003

(87) PCT Pub. No.: WO02/20426

PCT Pub. Date: Mar. 14, 2002

(30) Foreign Application Priority Data

Sep. 4, 2000 (DE) ........................ 100 44 656

(51) Int. Cl.$^7$ ..................... C04B 35/565; C04B 38/00
(52) U.S. Cl. ..................... 501/88; 501/81; 501/82; 501/83; 501/89; 501/90; 501/91; 264/44
(58) Field of Search .............. 501/88, 89, 90, 501/91, 81, 82, 83; 264/44

(56) References Cited

U.S. PATENT DOCUMENTS

| | | | |
|---|---|---|---|
| 3,090,094 A | | 5/1963 | Schwarzwalder et al. |
| 4,230,497 A | | 10/1980 | Schwetz et al. |
| 4,885,263 A | | 12/1989 | Brockmeyer et al. |
| 5,039,340 A | * | 8/1991 | Hargus et al. ............. 501/81 |
| 5,441,799 A | | 8/1995 | Owens et al. |
| 5,449,654 A | * | 9/1995 | Prin et al. ................. 502/178 |
| 6,524,522 B2 | * | 2/2003 | Vaidyanathan et al. ...... 419/2 |
| 6,635,339 B1 | | 10/2003 | Adler et al. |
| 2003/0180171 A1 | * | 9/2003 | Artz et al. .................. 419/2 |

FOREIGN PATENT DOCUMENTS

| | | |
|---|---|---|
| DE | 3540451 | 6/1986 |
| DE | 10044656 | 3/2003 |
| WO | 93/25495 | 12/1993 |
| WO | 97/45381 | 12/1997 |

OTHER PUBLICATIONS

K. Koumoto et al., "Thermal Shock Resistance of Porous SiC Ceramics", Transactions and Journal of British Ceramic Society, vol., 90, No. 1 (1991).

Andrew J. Sherman et al., "Refractory Ceramic Foams: A Novel, New High–temperature Structure", Ceramic Bulletin, vol. 70, No. 6, pp. 1025–1029 (1991).

Koumoto et al., "Thermal Shock Resistance of Porous SiC Ceramics", Transactions and Journal of British Ceramic Society, vol., 90, No. 1 (1991).

Ceramic Society,vol., 90, No. 1 (1991).

Andrew J. Sherman et al., "Refractory Ceramic Foams: A Novel, High–temperature Structure", Ceramic Bulletin, vol. 70, No. 6, pp. 1025–1029 (1991).

* cited by examiner

*Primary Examiner*—Karl Group
(74) *Attorney, Agent, or Firm*—Greenblum & Bernstein, P.L.C.

(57) ABSTRACT

The invention relates to the field of ceramics and open-celled silicon carbide foam ceramics, which can find application, for example, as high temperature- and thermal shock-resistant silicon carbide foam. The aim of the invention is to disclose an open-celled silicon carbide foam ceramic with improved thermal shock resistance, which may be produced by a simple method. Said aim is achieved with an open-celled silicon carbide foam ceramic, the structure of which is made up of sintered silicon carbide with a 5 to 30% pore volume of closed pores with an average diameter of <20 μm. The invention further relates to a method for the production of an open-celled silicon carbide foam ceramic, whereby coarse and fine silicon carbide powder in the ratio 20:80 to 80:20 parts are mixed and a suspension produced therefrom. An open-celled foam or open-celled network is then coated with said suspension, the foam or network material removed and sintering carried out at a temperature of >1800° C. under a protective atmosphere or in vacuo.

20 Claims, No Drawings

OPEN-CELLED SILICON CARBIDE FOAM CERAMIC AND METHOD FOR PRODUCTION THEREOF

FIELD OF APPLICATION OF THE INVENTION

The invention refers to the field of ceramics and relates to open-celled silicon carbide foam ceramics that can be used, e.g., as high temperature- and thermal shock-resistant silicon carbide foam, e.g., as volume burners, diesel exhaust particulate filters, heating elements or solar receivers, and a process for their production.

PRIOR ART

Open-celled ceramic foams comprise a three-dimensionally cross-linked ceramic structure of many ceramic webs connected to one another and open cells lying between the webs. The type of ceramic from which the webs are made can be varied and determines essential properties of the foam. Open-celled foam ceramics are mainly produced by a second cast process in which an open-celled framework structure, e.g., of polymer foam or carbon foam is coated with ceramic and the original substrate is removed either during or after the ceramic formation (U.S. Pat. No. 3,090,094). Silicon carbide foam is interesting because this ceramic can give the foam special properties, such as high temperature- and corrosion-resistance, good thermal conductivity, hardness, etc.

Open-celled ceramic foams on the basis of silicon carbide ceramic are used mainly for molten metal filtration, especially of gray cast iron and nonferrous metal. To this end a foam ceramic is used, the cell walls of which are made of a silicon carbide ceramic that is made of silicon carbide grains that are bound with an aluminosilicate binder phase. This ceramic is made by mixing silicon carbide powder with clay and/or silicon dioxide (e.g., in the form of siliceous sol) and aluminum oxide (U.S. Pat. No. 4,885,263). The sintering occurs in air at temperatures in the range of 1100° C. to 1400° C. A covering of the SiC grains with vitreous or semi-crystalline aluminosilicate compounds thereby occurs. One advantage of this ceramic is that no shrinkage or only a slight shrinkage occurs during the sintering This is important above all because during sintering the foam has a condition where the supporting framework of the polymer foam is already burnt but the ceramic is not yet completely sintered and thus strengthened. If additional shrinkage occurs during this phase, foam ceramic molded parts, in particular those with large and complex dimensions, have a strong tendency to crack or disintegrate. As a rule, ceramics with no shrinkage or only a low shrinkage feature a fine porosity of the ceramic in the webs. This porosity leads to low strength and poor durability during contact with corrosive media when it is accessible for these media. It is therefore advantageous if the pores are closed. However, this ultra-fine porosity is advantageous for the thermal shock resistance of ceramics (Transactions and Journal of the British Ceramic Society, 90 (1991) 1, 32 ff).

Sintered silicon carbide is produced by mixing very fine silicon carbide powder (average grain size <2 $\mu$m) with very low amounts of sintering aids (boron/carbon or boron/aluminum/carbon) and sintering them at temperatures above 1800° C. in protective gas or a vacuum (U.S. Pat. No. 4,340,497). It is possible to produce a foam ceramic from this sintered silicon carbide, but this ceramic usually has a porosity of only <2% in the webs and consequently does not have a high thermal shock resistance. During sintering a high shrinkage of 15 to 25% occurs, which leads to a destruction of the foam ceramic during sintering for the above-mentioned reasons. The addition of low amounts of carbon as a component of the sintering aid serves during the sintering of silicon carbide to remove the oxygen from the surface of the SiC powder particles and thus the sinter activation.

However, other uses for silicon carbide foam ceramics are also increasingly significant in which the ceramics are subjected to even higher stresses with regard to high temperature- and thermal shock resistance, than occur in molten metal filtration, e.g., as volume burner, diesel exhaust particulate filter, heating element and solar receiver. The aluminosilicate-bound SiC ceramics thereby fail at temperatures >1400° C. through softening and disintegration due to reactions between the binder phase and the SiC.

Ceram. Bull. Vol 70, No. 6, 1991, 1025–29 discloses a process in which an open-celled carbon is coated with ceramic, i.e., also with pure SiC, by means of CVD or CVI coating. However, CVD-SiC ceramic is dense and therefore has a lower thermal shock resistance. Another disadvantage is that the process is very laborious and expensive and is limited regarding the uniformity of the coating, in particular in the case of molded parts with complex forms.

Furthermore, a ceramic foam filter and a process for its production is known from DE 35 40 451 A1, which filter is made of a three-dimensionally cross-linked ceramic structure composed of many interconnected ceramic strands and pores located between the strands, whereby each strand features a large number of fine pores. The apparent porosity is thereby approx. 20% and the pore diameter is between 20 and 100 $\mu$m. This ceramic foam filter is produced by mixing small-particle oxide ceramic material with water and a binder and additionally small particles of a carbon material. A foam is impregnated with the slip once or several times, the foam material is fired out and the oxide ceramic is sintered at 1500° C. During the firing the carbon material is also fired out, forming a large number of fine pores.

With this solution ceramic foam filters are produced for filtering molten metals, which filters feature an improved degree of filter effectiveness. Through the large number of fine continuous or connected pores, the effective surface of the ceramic strands for the adsorption of material to be filtered is enlarged. This effect is increased if as large a number as possible of relatively large pores and/or many small continuous/connected pores is obtained in the ceramic material.

DESCRIPTION OF THE INVENTION

The present invention relates to an open-celled silicon carbide foam ceramic with improved thermal shock resistance, in which ceramic the ceramic webs have as few as possible troublesome secondary phases and contain closed pores, and which can be produced with a simple process.

The open-celled silicon carbide ceramic according to the invention is composed of a three-dimensionally cross-linked ceramic structure of many ceramic webs connected to one another and open cells lying between the webs, whereby the webs are composed essentially of sintered silicon carbide with 5 to 30% pore volume, preferably 5–15% pore volume, of completely closed or essentially completely closed pores with an average pore diameter of <20 $\mu$m, preferably 1–10 $\mu$m.

This open-celled silicon carbide foam ceramic is produced according to the invention in that a mixture of coarse (average grain size 5 to 100 μm, preferably 10 to 50 μm) and fine silicon carbide powder (average grain size <2 μm) in a ratio of 20:80 to 80:20% (preferably 40:60 to 60:40) and, as is known, of small amounts of sintering additives (boron/carbon or boron/aluminum/carbon) is produced and a suspension is made from this powder mixture. An open-celled foam or an open-celled network is coated with this suspension according to methods known per se, the foam or the network is dried, the foam or the network material is removed and the remaining green body is sintered at temperatures >1800° C. in protective gas or a vacuum.

Polyurethane foams or networks of organic synthetic or natural fibers can advantageously be used.

These foam or network materials can be removed by firing, vaporizing, corroding, dissolving.

The sintering advantageously takes place at temperatures in the range of 1800–2300° C., even more advantageously in the range of 2000–2150° C.

By adding the coarse powder, the shrinkage during sintering is reduced to values below 8% and a fine, closed porosity develops in the ceramic webs.

The average pore diameter and the pore volume are determined according to the invention by light microscopy or electron microscopy image analysis evaluation methods on polished sections of the open-celled silicon carbide foam ceramics.

Without the use of secondary phases, the shrinkage during sintering of the silicon carbide foam-ceramics is so great that their strength is no longer sufficient for use.

Through the solution according to the invention it is possible on the one hand to do without secondary phases and on the other hand still to produce a silicon carbide foam ceramic with improved thermal shock resistance and sufficient strength which shrinks only slightly during sintering.

To obtain such a foam ceramic a rather lower pore volume (towards 10–5%) and relatively small, independent closed pores in the ceramic (towards 10–1 μm average pore diameter) is particularly advantageous.

The present invention relates to an open-celled silicon carbide foam ceramic comprising a three-dimensionally cross-linked ceramic structure of many webs connected to one another and open cells lying between the webs, the webs comprise substantially sintered silicon carbide with 5 to 30% pore volume of completely closed or substantially completely closed pores with an average diameter of <20 μm.

The present invention also relates to a process for producing an open-celled silicon carbide foam ceramic with 5 to 30% pore volume of completely closed or substantially completely closed pores with an average diameter of <20 μm in the webs comprising mixing coarse silicon carbide powder and fine silicon carbide powder in a ratio of 20:80 to 80:20 with sintering additives to obtain a mixture, the coarse silicon carbide powder having an average grain size of 5–100 μm and the fine silicon carbide powder having an average grain size of <2 μm, forming a suspension from the mixture, and subsequently coating an open-celled foam or an open-celled network with the suspension at least once, drying the foam or the network, removing the foam or network material and sintering the remaining green body at temperatures ≧1800° C. in protective gas or in a vacuum.

The present invention also relates to open-celled silicon carbide foam ceramics produced by processes according to the present invention.

BEST WAY TO IMPLEMENT THE INVENTION

The invention is described below in more detail on the basis of exemplary embodiments.

EXAMPLE 1

A ceramic suspension is produced on a water basis. This contains a bimodal SiC grain distribution, produced by mixing SiC powders with an average grain diameter of 1.2 and 18 μm in a ratio of 50:50%; in addition 0.6% boron (carbide) and 9% water soluble phenolic resin (corresponds to 3% carbon after pyrolysis) as a sintering additive. The suspension is adjusted to a solids content of 84%.

To produce the foam ceramic a polyurethane foam with a cell width of 10 ppi (pores per inch) is impregnated with the suspension and subsequently the excess suspension is separated with a centrifuge. A coating weight of 20 g results for a sample with the dimensions 40×40×25 mm. Subsequently the body is dried and the polyurethane is fired out up to a temperature of 600° C. in an inert atmosphere. The remaining SiC powder framework is sintered in an argon atmosphere at a temperature of 2100° C. The sample shrinks linearly by 4% during sintering, so that the final dimensions are 39×39×24 mm. The average breaking load with a die impression of 20 mm in diameter is 300 N. The webs of the foam ceramic contain approx. 10% closed pores with an average diameter of approx. 5 μm. After heating of the ceramic to 1000° C. in air, a quenching takes place in cold water. The strength measured after this is still 285 N.

EXAMPLE 2

An SiC suspension is produced on a water basis. This contains a bimodal SiC grain distribution produced by mixing SiC powders with average grain diameters of 1.8 and 54 μm in a ratio of 25:75%; in addition 0.6% boron (carbide) and 3% lamp black as a sintering additive. The suspension is adjusted to a solids content of 78%.

To produce the foam ceramic a polyurethane foam with a cell width of 45 ppi is impregnated with the suspension and subsequently the excess suspension is squeezed out via a roll system. A coating weight of 38 g results for a sample with a diameter of 83 mm and a height of 10 mm. Subsequently the body is dried and the polyurethane is fired out up to a temperature of 600° C. in an inert atmosphere. The remaining SiC powder framework is fired in argon at a temperature of 2130° C. The sample shrinks by 3% linearly during sintering, so that the final dimensions are a diameter of approx. 80.5 mm and a height of 9.7 mm. The webs of the foam ceramic contain approx. 15% closed pores with an average diameter of approx. 12 μm. The average breaking load with a die impression of 20 mm in diameter is 290 N. After heating of the ceramic to 1000° C. in air, a quenching takes place in cold water. The strength measured after this is still 275 N.

COMPARATIVE EXAMPLE

A ceramic suspension is produced on a water basis. This contains an SiC powder with an average grain diameter of 1.2 tun, 0.6% boron (carbide) and 9% of a water-soluble phenolic resin (corresponds to 3% carbon after pyrolysis) as a sintering additive. The suspension is adjusted to a solids content of 75%.

To produce the foam ceramic a polyurethane foam with a cell width of 45 ppi is impregnated with the suspension and subsequently the excess suspension is squeezed out via a roll system. A coating weight of 37 g results for a sample with a diameter of 83 mm and a height of 10 mm. Subsequently the body is dried and the polyurethane is fired out up to a temperature of 600° C. in an inert atmosphere. The remaining SiC powder framework is fired in argon at a temperature of 2120° C. The sample shrinks linearly by 22% during sintering and, after sintering, is penetrated by many macroscopic cracks on the supporting side. The webs of the foam ceramic contain approx. 2% closed pores with an average diameter of <0.5 µm. The strength of a crack-free area of the sample, determined by the impression of a die with a diameter of 20 mm, is 332 N. After heating of the ceramic to 1000° C. in air, a quenching takes place in cold water. The strength measured after this is only 170 N.

What is claimed is:

1. Open-celled silicon carbide foam ceramic comprising a three-dimensionally cross-linked ceramic structure of many webs connected to one another and open cells lying between the webs, said webs comprise substantially sintered silicon carbide with 5 to 30% pore volume of completely closed or substantially completely closed pores with an average diameter of <20 µm.

2. The open-celled silicon carbide foam ceramic according to claim 1, wherein the webs have a pore volume of 5–15% of completely closed or substantially completely closed pores.

3. The open-celled silicon carbide foam ceramic according to claim 2, wherein the webs have a pore volume of 5–10% of completely closed or substantially completely closed pores.

4. The open-celled silicon carbide foam ceramic according to claim 1, wherein the average diameter of the pores in the webs is 1–10 µm.

5. Process for producing an open-celled silicon carbide foam ceramic with 5 to 30% pore volume of completely closed or substantially completely closed pores with an average diameter of <20 µm in the webs comprising mixing coarse silicon carbide powder and fine silicon carbide powder in a ratio of 20:80 to 80:20 with sintering additives to obtain a mixture, the coarse silicon carbide powder having an average grain size of 5–100 µm and the fine silicon carbide powder having an average grain size of <2 µm, forming a suspension from the mixture, and subsequently coating an open-celled foam or an open-celled network with the suspension at least once, drying the foam or the network, removing the foam or network material and sintering the remaining green body at temperatures >1800° C. in protective gas or in a vacuum.

6. The process according to claim 5, wherein the coarse silicon carbide powder comprises coarse silicon powder with an average grain size of 10–50 µm.

7. The process according to claim 5, wherein the ratio of coarse to fine silicon carbide powder is 40:60 to 60:40.

8. The process according to claim 5, wherein the sintering additives comprise boron and carbon or boron, aluminum and carbon.

9. The process according to claim 5, wherein the open-celled foam or an open-celled network comprises polyurethane foam or a network of organic synthetic or natural fibers.

10. The process according to claim 5, wherein removing the foam or network material comprises removing by firing, vaporizing, corroding, or dissolving.

11. The process according to claim 5, wherein sintering of the green body comprises sintering at temperatures in the range of 1800 to 2300° C.

12. The process according to claim 5, comprising using water as suspending agent.

13. The process according to claim 5, in which a shrinkage of <8% is set.

14. The process according to claim 11, wherein sintering of the green body comprises sintering at temperatures in the range of 2000 to 2150° C.

15. The process according to claim 8, wherein the sintering additives comprise boron and carbon.

16. The process according to claim 8, wherein the sintering additives comprise boron, aluminum and carbon.

17. An open-celled silicon carbide foam ceramic produced according to the process recited in claim 5.

18. An open-celled silicon carbide foam ceramic produced according to the process recited in claim 6.

19. An open-celled silicon carbide foam ceramic produced according to the process recited in claim 7.

20. An open-celled silicon carbide foam ceramic produced according to the process recited in claim 8.

* * * * *

UNITED STATES PATENT AND TRADEMARK OFFICE
CERTIFICATE OF CORRECTION

PATENT NO. : 6,887,809 B1
DATED : May 3, 2005
INVENTOR(S) : J. Adler et al.

It is certified that error appears in the above-identified patent and that said Letters Patent is hereby corrected as shown below:

Title page,
Item [75], Inventor, include -- Gisela Standke, Dresden, Germany --.

Signed and Sealed this

Twenty-third Day of August, 2005

JON W. DUDAS
*Director of the United States Patent and Trademark Office*